Nov. 29, 1932.  H. S. GIBSON ET AL  1,889,241
AUTO TRACTION AND ANTISKID DEVICE
Filed May 16, 1931   2 Sheets-Sheet 1
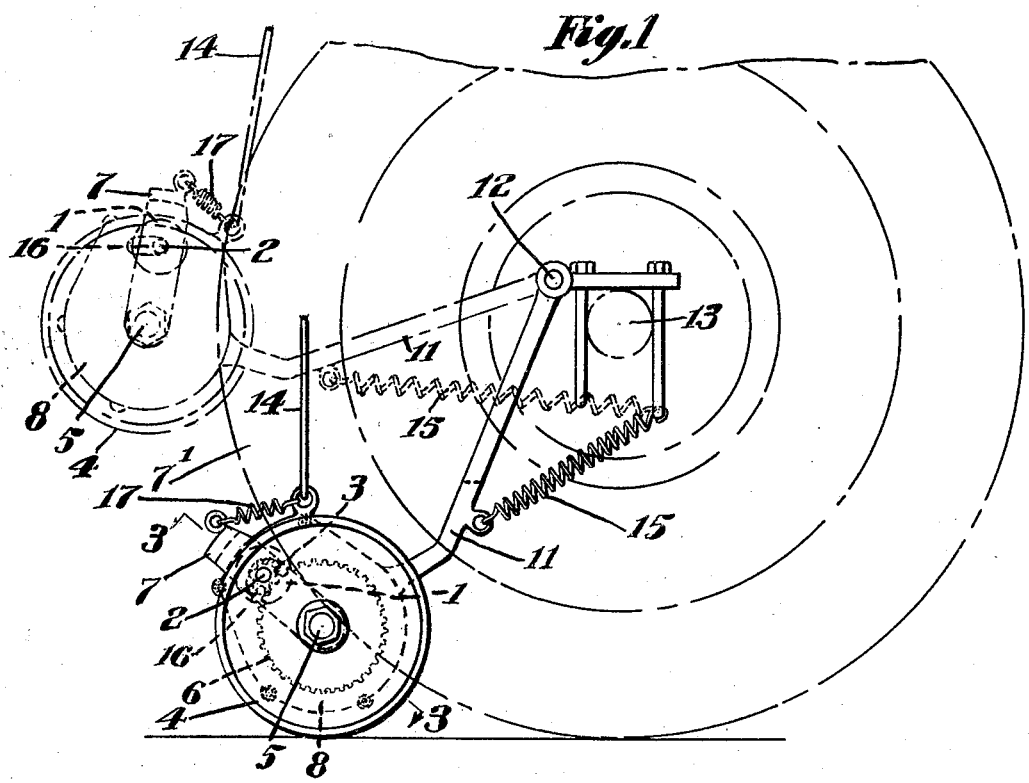
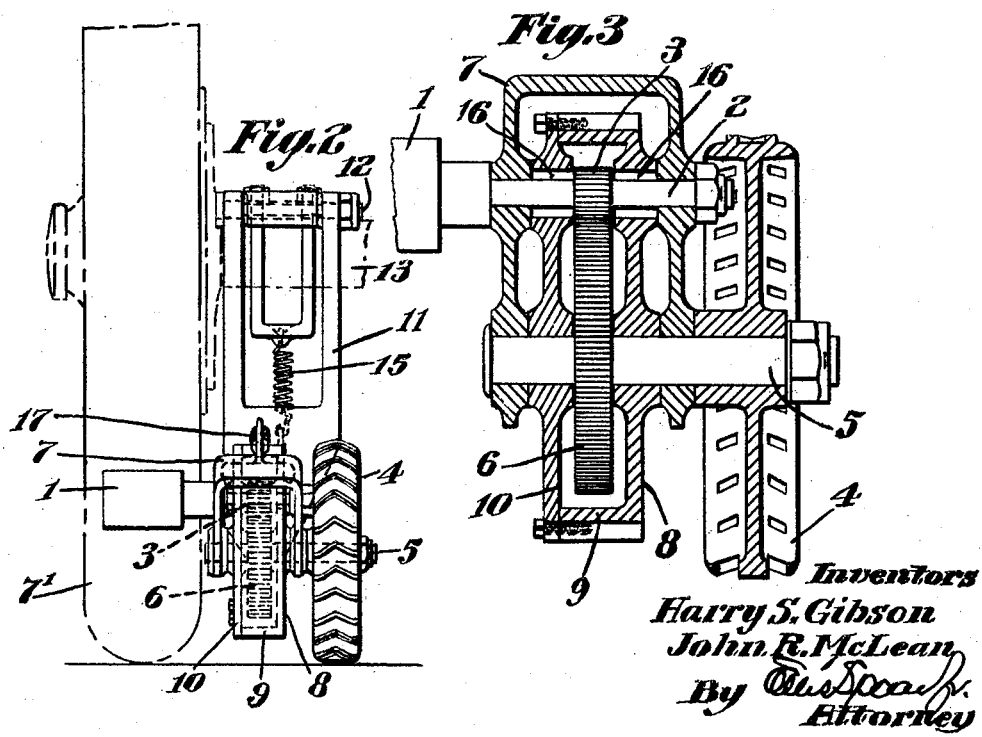
Inventors
Harry S. Gibson
John R. McLean Nov. 29, 1932.    H. S. GIBSON ET AL    1,889,241
AUTO TRACTION AND ANTISKID DEVICE
Filed May 16, 1931    2 Sheets-Sheet 2
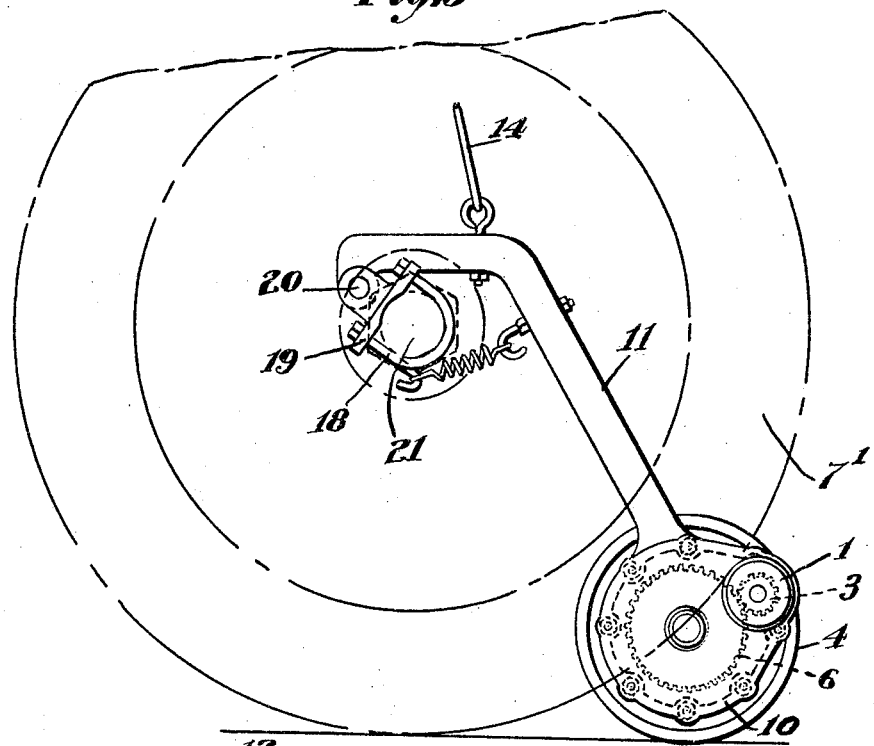
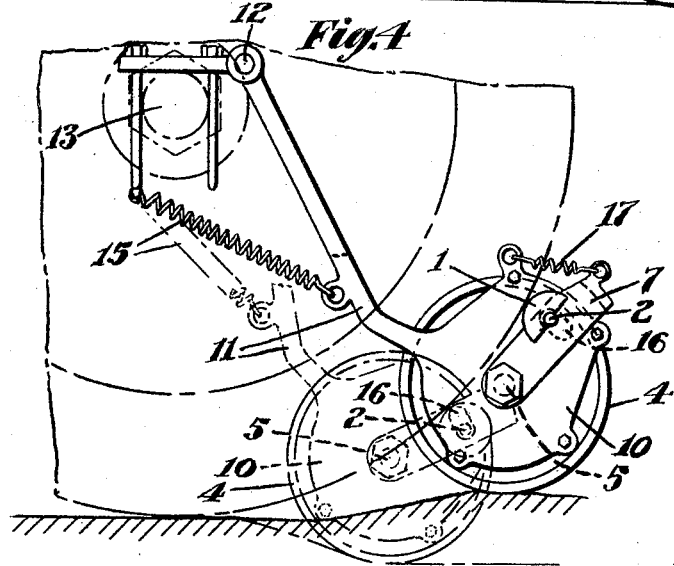
Inventors
Harry S. Gibson
John R. McLean
By Attorney Patented Nov. 29, 1932

1,889,241

UNITED STATES PATENT OFFICE

HARRY S. GIBSON AND JOHN R. McLEAN, OF NEWTON LOWER FALLS, MASSACHUSETTS

AUTO TRACTION AND ANTISKID DEVICE

Application filed May 16, 1931. Serial No. 537,932.

This invention relates generally to a movable and portable anti-skid and traction device adapted to be mounted in operative relation to a wheel of an automobile or other vehicle and so arranged as to be moved into and out of functioning position as desired, or when occasion requires.

One of the objects of the invention is to provide a device for utilizing driving traction between the vehicle wheel and the ground by a supplemental device having frictional engagement with the ground in a different plane than the wheel of the vehicle.

A further object is to provide a traction or anti-skid device exerting tractive effort with the ground in a different plane from the wheel, the effect of which is transmitted to the wheel through a traction roller or wheel which is rotating at a different speed in revolutions per minute than either the wheel of the vehicle or the wheel which is offset from and in tractional relation to the ground.

A further object of this invention is to provide a friction or anti-skid device comprising a plurality of wheels or rollers, arranged to rotate at different speeds, one of the wheels being in frictional engagement with a wheel of the vehicle, the other wheel resting on the ground with suitable driving connections and speed changing means being interposed between each of the wheels in order that the wheels may rotate at different speeds.

A further object of this invention is to provide a friction or anti-skid device comprising a plurality of wheels or rollers with speed change mechanism therebetween, one of the rollers being in frictional engagement with the wheels of the vehicle and the other with the ground, a compensating means which will enable the roller or wheel in frictional engagement with the vehicle wheel to be maintained in such relation for different positions of the second wheel in a vertical plane, relative to the wheel of the vehicle within certain limits such as are likely to be encountered in traveling over a rough road.

Without some compensating means, the wheel of the anti-skid device, in contact with the ground, is likely to be raised from the ground in the event that the main wheel of the vehicle passes over a rough portion in the road surface.

A further object of this invention is to provide traction means by which a minimum tractive force between the wheel and the surface traversed is effective to move the vehicle forward, such relatively smaller tractive force being effective where a larger tractive force between the surface of the larger wheel and the surface traversed would result in skidding or slipping.

A further object of this invention is to provide in a traction and anti-skid device including a pulley or roller in frictional driving relation with the periphery of an automobile wheel, a wheel having an anti-skid surface thereon in contact with the ground, and a positive drive and speed change mechanism between the roller and wheel, and means which will permit relative rotary movement of the wheel in contact with the ground, about the axis of the roller or wheel in contact with the wheel periphery.

One selected embodiment and a modified form of the invention is shown in the accompanying drawings for purposes of illustration.

In the drawings:

Fig. 1 is a side elevation showing the application of the device to a wheel of a vehicle, the full line position indicating the position of the device when in functioning position, and the dot and dash line showing of the device indicating the position when drawn upward out of functioning position.

Fig. 2 is an end elevation of Fig. 1.

Fig. 3 is a section taken generally on the line 3—3 and looking in the direction of the arrows.

Fig. 4 is an elevation view showing the device in functioning position, and illustrating the action of the compensating means to permit the roller to be maintained in frictional driving relation with the periphery of the wheel when passing over a rough road in which the device is either raised or lowered either above or below the surface on which the main wheel of the vehicle is traveling as, for example, when traveling over a rough road.

Fig. 5 is a view showing a modified form of the device.

As shown in the drawings, the device includes the relatively small wheel or roller 1 having a shaft 2 with a gear 3 thereon and another wheel 4 mounted on a shaft 5 with a gear 6 on said shaft, the gears 3—6 being in driving relation.

The wheel 1 is adapted to frictionally engage the surface of the vehicle wheel 7', and the wheel 4 is adapted to rest upon the road surface. Preferably the surface of the wheel 4 is of non-skid type and preferably of a material different than the usual rubber surface of the tire of the vehicle in order to increase the friction and traction between the wheel and the ground. As shown, the surface contacting with the road is of non-skid construction and is formed of metal, but if desired, under certain conditions, the road contacting surface of the wheel 4 may be formed of the usual rubber non-skid tread type of construction.

The shafts 2 and 5 are rotably mounted in a common member such as the yoke 7 so that the shafts 2 and 5 are held in proper spaced relation, and the gears 3—6 are maintained in proper driving relation.

A casing 8 is provided for the gears, and as shown the casing is formed in two portions, including the drum shaped body 9 having a recess therein to receive the gears, and a cover plate 10 which is bolted or otherwise suitably secured upon the body 9. A bracket arm 11 is connected with the casing 8 at one end, the other end of the bracket arm being pivotally connected as at 12 to the vehicle, the point of pivotal connection preferably being at a point offset from or eccentric to the center or axis 13 of the vehicle wheel, such pivotal point preferably being to one side and above the axis of the vehicle wheel so that the traction non-skid device may be drawn upward out of operative relation with the ground and the vehicle wheel, by means of a cable 14 or other suitable means. The dot and dash position of the device as indicated in Fig. 1 shows the device drawn upward out of functioning position. Suitable means may be provided under the control of the operator of the vehicle for lowering and raising the device to operative functioning position, as desired, and when occasion requires.

A yielding means such as a spring 15 is provided to yieldingly hold the wheels 4 in engagement with the ground. One end of the spring 15 is shown connected to the bracket arm 11 and the other end is connected to a suitable point on the vehicle.

While the casing 8 is mounted to permit rotation of the shaft 5 therein, the sides of the casing are provided with slots 16 to permit a limited relative rotary movement of the shaft 2 on which the wheel 1 is mounted, about the axis of the shaft 5. The purpose of such a construction is to provide compensating means which will enable the wheel 1 to be maintained in frictional driving relation with the surface of the vehicle wheel, under different road conditions, for example, when the road is rough and under conditions in which the wheel 4 is likely to be either above or below the surface on which the main vehicle wheel is traveling. These two conditions are illustrated in Fig. 4 in which the full line position of the device indicates one in which the main vehicle wheel is traveling on a surface below the surface supporting the wheel 4. The dotted line position of the device indicates a condition in which the main vehicle wheel 7' is traveling on a surface above the surface on which the wheel 4 is supported. In either one of these two positions, by utilizing the compensating means, the wheel 1 is at all times maintained in frictional driving engagement with the vehicle wheel.

Without some provision for a compensating means to take care of conditions encountered in uneven and rough roads, the wheel 4 would be alternately brought into and out of driving relation with the ground, particularly where the wheel 4 is pivotally supported in eccentric relation to the axis of the vehicle wheel.

A spring 17 is provided, in order to maintain the wheel 1, having a shaft rotatably supported in the yoke 7, in yielding frictional driving relation with the vehicle wheel 7', under conditions in which the wheel 4 passes over portions of the road either above or below that upon which the main vehicle wheel 7' is traveling. One end of the spring 17 is connected to the yoke 7, and the other end is connected to the casing 8 so that the slot 16 in the casing will permit a certain limited relative movement between the shaft 2 and the casing 8 in which the shaft 5 carrying the wheel 4 is rotatably mounted.

A modified form is shown in Fig. 5 in which the point of eccentric support of the bracket arm 11 with the vehicle is located at a different point and is so disposed that slight irregularities in the road will not have the tendency to throw the wheel 1 out of frictional driving engagement with the vehicle wheel 7'.

The method of mounting the end of the arm is different than that shown in Fig. 1, in that a U bolt 18 fits over the housing for the shaft of the vehicle wheel, and a bracket 19 is provided having means for pivotally supporting the end of the arm 11 at the point 20 which is disposed at a point on substantially the diametrical line passing through the axis of the wheel and the point at which the wheel 1 engages the vehicle wheel, the pivotal point of support 20 however being on the opposite side of the center or axis 21 of the vehicle wheel.

One of the distinct advantages in utilizing a traction device of the type herein disclosed, is that it provides a means of obtaining a driving traction for propelling the vehicle forward, in which a plurality of traction surfaces in contact with the ground may be utilized for obtaining a positive driving effort, through the frictional engagement of one of the driving members with the wheel. If the coefficient of friction between the road surface which may be wet or covered with snow or ice and the surface of the main wheel, and the effective force applied, are such as to cause a slipping and skidding of the main wheel, by utilizing the present device, a driving force may be effected to move the vehicle forward by the utilization of a smaller force at the periphery of the wheel 4 acting through the speed change mechanism and the wheel in frictional engagement with the main vehicle wheel 7', and this relatively smaller force is effective to drive the vehicle forward even though such force might be less than the larger force effective at the periphery of the main vehicle wheel which might normally cause slipping. Stated in another way, it might be said that on slippery surfaces where the coefficient of friction is relatively low, the driving traction between the smaller wheel 4 and the surface, is more readily effective and controlled to urge the vehicle forward than is the larger tractive force that would be effective between the surface of the main vehicle wheel and the road surface.

The size of the wheels 1 and 4, and the ratio of the speed change mechanism is such that preferably the surface speed of the wheel 4 is substantially the same as the surface speed of the main vehicle wheel 7'. However, the wheel 4 rotates at a higher speed in revolutions per minute, than the vehicle wheel 7', so that it is for this reason that a smaller force applied at the periphery of the wheel 4 (which force is transmitted through the speed change mechanism and the wheel 1 to the periphery of the main vehicle wheel 7') is effective to urge the vehicle forward or retard the same without slipping, than a larger force effective between the surface of the main vehicle wheel and the ground which might cause slippage or spinning of the vehicle wheels.

While one preferred form and modification of the invention has been herein shown for purposes of illustration, it is, of course, understood that various changes and modifications in detail, construction and arrangement of parts may be made without departing from the spirit and scope of the invention as defined in the appended claims.

What we therefore claim and desire to secure by Letters Patent is:

1. A traction and anti-skid device adapted to be attached to a vehicle in cooperative relation to the vehicle wheel, comprising a friction drive wheel adapted to be placed in frictional driving relation with the vehicle wheel, a relatively small traction and anti-skid wheel adapted to engage the ground, a positive driving and gear reduction mechanism interposed between the anti-skid wheel in engagement with the ground and the friction drive wheel in frictional engagement with the vehicle wheel, means for maintaining the vehicle wheel and friction drive wheel and the gear reduction mechanism in operative relation with each other for different positions of the anti skid wheel on an arc eccentric with the axis of the vehicle wheel, and means arranged to permit limited rotary movement of the friction drive wheel in an arc eccentric with the axis of the vehicle wheel, said means including a yoke for rotatably supporting the two wheels, and a casing having a slot therein to permit limited movement of the friction drive wheel through an arc eccentric with the axis of the vehicle wheel.

2. A traction and anti-skid device adapted to be attached to a vehicle in cooperative relation to the vehicle wheel, comprising a friction drive wheel adapted to be placed in frictional driving relation with the vehicle wheel, a relatively small traction and anti-skid wheel adapted to engage the ground, a positive driving and gear reduction mechanism interposed between the anti-skid wheel in engagement with the ground and the friction drive wheel in frictional engagement with the vehicle wheel, means for maintaining the vehicle wheel and the friction wheel and the gear reduction mechanism in operative relation with each other for different positions of the anti skid wheel on an arc eccentric with the axis of the vehicle wheel, and means arranged to permit limited rotary movement of the friction drive wheel in an arc eccentric with the axis of the vehicle wheel, said means including a yoke for rotatably supporting the two wheels and a casing having a slot therein to permit limited movement of the friction drive wheel through an arc eccentric with the axis of the vehicle wheel, a yielding means connecting said yoke with said casing and serving to yieldingly hold friction drive wheel in engagement with the vehicle wheel, and a bracket connecting said casing to the vehicle, the bracket being pivotally mounted at a point eccentric to the axis of the vehicle wheel.

3. A traction and anti-skid device adapted to be attached to a vehicle in cooperative relation to the wheel, comprising a wheel adapted to be placed in frictional driving relation with the wheel, a relatively small traction and anti-skid wheel adapted to engage the ground, a positive driving and gear reduction mechanism interposed between the wheel in engagement with the ground and the wheel in frictional engagement with the wheel, a shaft for each of said wheels, a gear mounted on each shaft, and means for rotatingly supporting each of said shafts in spaced relation with the gears in engagement, a casing for the gears rotatably mounted on the shaft of the wheel in engagement with the ground, and an arm connected with the casing at one end, and pivotally connected with the vehicle at the other end, the pivotal point of connection to the vehicle being at a point offset from the axis of the wheel, said casing having a slot therein to permit relative movement of the shaft for the wheel in frictional engagement with the vehicle wheel and the casing in order to permit relative rotary movement of one of the wheels about the axis of the other wheel, and yielding means connecting the casing and the means in which the two shafts are rotatably mounted.

4. A traction and anti-skid device adapted to be attached to a vehicle in cooperative relation to the wheel, comprising a friction drive wheel adapted to be placed in frictional driving relation with the wheel, a relatively small traction and anti-skid wheel adapted to engage the ground, a positive driving and gear reduction mechanism interposed between the wheel in engagement with the ground and the wheel in frictional engagement with the vehicle wheel, means for maintaining the vehicle wheel and the friction drive wheel and the gear reduction mechanism in operative relation with each other, for different positions of the anti-skid wheel through an arc eccentric with the axis of the vehicle wheel said means including a yoke, a shaft for each of the wheels, said shafts being rotatably mounted in the yoke, and a casing for the gears said casing being rotatably mounted on the shaft for the wheel in engagement with the ground, said casing having a slot therein to permit relative rotary movement between the casing and the shaft leading to the wheel in frictional engagement with the vehicle wheel, a spring connecting the yoke and the casing to maintain the friction drive wheel in frictional engagement with the vehicle wheel, for different relative positions of the wheel in engagement with the ground, and the wheel in engagement with the vehicle wheel and a bracket arm connecting the casing with the vehicle.

5. A traction and anti-skid device adapted to be attached to a vehicle in cooperative relation to the wheel, comprising a friction drive wheel adapted to be placed in frictional driving relation with the wheel, a relatively small traction and anti-skid wheel adapted to engage the ground, a positive driving and gear reduction mechanism interposed between the vehicle wheel in engagement with the ground and the wheel in frictional engagement with the vehicle wheel, means for maintaining the vehicle wheel and the friction drive wheel and the gear reduction mechanism in operative relation with each other, for different positions of the anti-skid wheel through an arc eccentric with the axis of the vehicle wheel, said means including a yoke, a shaft for each of the wheels, said shafts being rotatably mounted in the yoke, and a casing for the gears said casing being rotatably mounted on the shaft for the wheel in engagement with the ground, said casing having a slot therein to permit relative rotary movement between the casing and the shaft leading to the wheel in frictional engagement with the vehicle wheel, a spring connecting the yoke and the casing to maintain the friction drive wheels in frictional engagement with the vehicle wheel, for different relative positions of the wheel in engagement with the ground, and the wheel in engagement with the vehicle wheel and a bracket arm connecting the casing with the vehicle, the bracket arm being connected to the vehicle at a point eccentric to the axis of the wheel, and means for moving the traction and anti-skid device out of operative relation to the wheel.

In testimony whereof we affix our signatures.

JOHN R. McLEAN.
HARRY S. GIBSON.